F. C. WEIR.

Railroad-Frog.

No. 8,915. Reissued Sept. 30, 1879.

Attest

John E. Jones

Cornelius Ryl

Inventor

Frederic C. Weir

N. PETERS, PHOTO-LITHOGRAPHER, WASHINGTON, D. C.

UNITED STATES PATENT OFFICE.

FREDERIC C. WEIR, OF CINCINNATI, OHIO.

IMPROVEMENT IN RAILROAD-FROGS.

Specification forming part of Letters Patent No. 215,548, dated May 20, 1879; Reissue No. 8,915, dated September 30, 1879; application filed August 18, 1879.

DIVISION B.

*To all whom it may concern:*

Be it known that I, FREDERIC C. WEIR, of Cincinnati, Hamilton county, State of Ohio, have invented an Improvement in Railroad-Frogs, of which the following is a specification.

My invention relates to the class of frogs made by the bending of the overlapping ends of the rails themselves, and the junction of the same with the central rails constituting the point by rivets or bolts through separating-pieces; and my invention consists—

First, in such a formation and connection of the two rails which make up the angular point as that one of the rails extends unbroken and uncut directly across the path of the other, and in itself makes a solid end to the point, with a full-width flange, which is overlapped by the flange of the other rail, and thus a flange of double thickness is afforded at a point where strength is particularly needed, and the cutting away of the flanges (as is the usual custom) avoided entirely. This part of my invention being embraced and claimed in Division A of this reissue, I do not herein claim it.

Second, in an improved manner of connecting the two rails of the point together and to angle-iron pieces, to which the outer rails are connected.

One of the objects of this invention is to furnish a firm lateral support upon each side of the V-shaped rails by means of angle-irons, which, in connection with a bottom plate, at the same time unite and hold the center rails forming the V to the wing-rails, whereby all the parts are firmly united and held in their proper relative positions.

Figure 2:
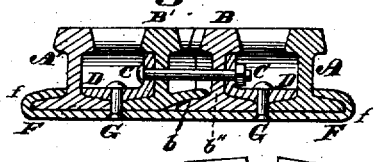
Figure 1:
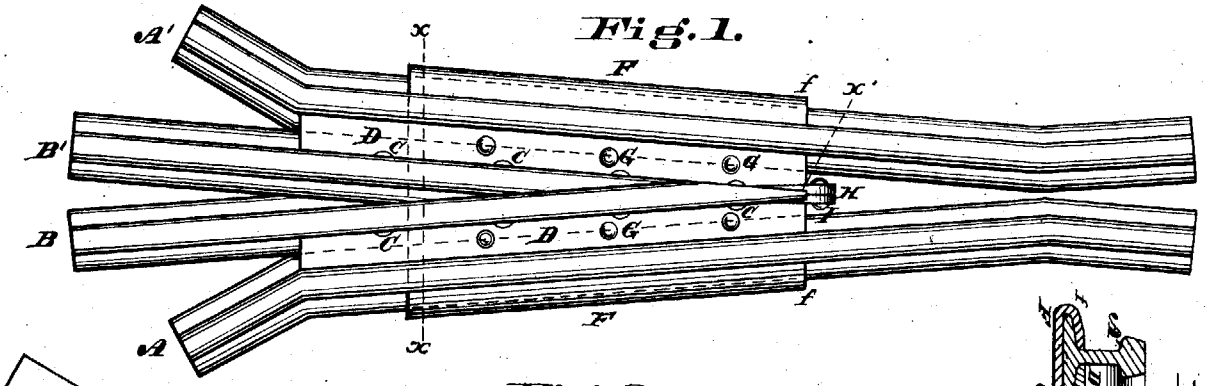
Figure 3:
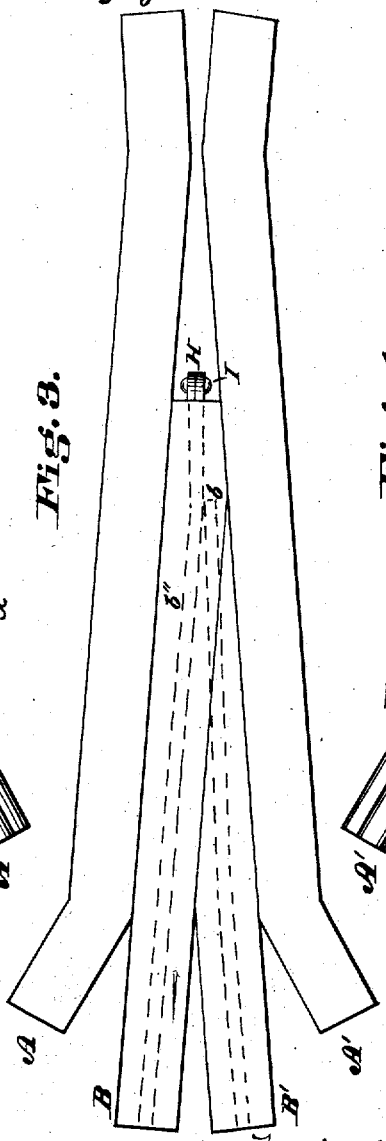

In the accompanying drawings, Figure 1 is a plan of a frog embodying my improvement. Fig. 2 is a cross-section of the same on line *x x*. Fig. 3 is a plan of the under side of the frog, showing the continuation of the main point-rail, with a full width of flange throughout.

Figure 4:
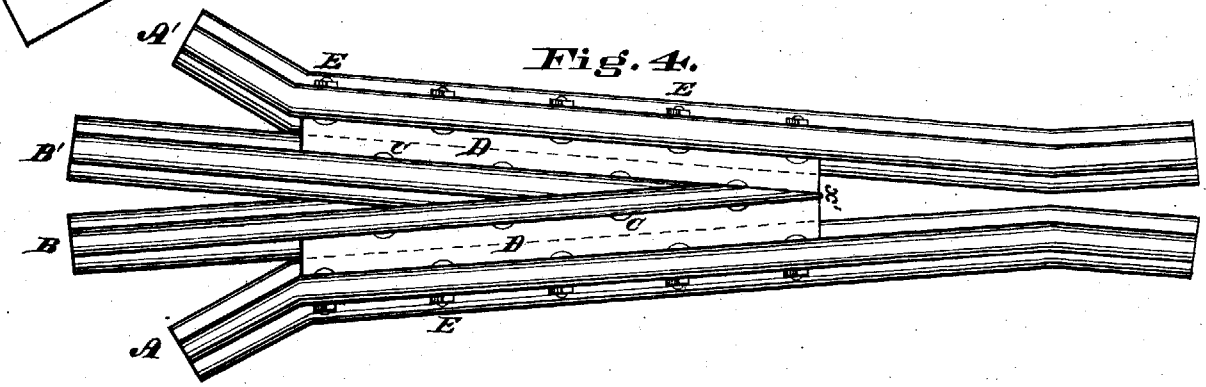
Figure 5:
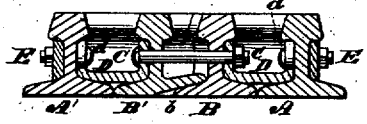

It will not be necessary to describe the devices shown in Figs. 4 and 5, as they are fully described in Division A of this reissue.

A A′ are the outer or wing rails of the frog, and B B′ are the two rails which compose the acute angle or point.

In place of cutting away both the flanges of the rails B B′, so as to make a joint between the two rails midway between the lines of the angle of the frog—as is common now, and I may say usually practiced—I continue the flange *b* of rail B of full width intact clear along the junction of the two rails to the point where it strikes the flange of the outer rail, as shown in Fig. 3, which is almost immediately under the point X′ of the frog, and I swage up the flange *b′* of rail B′ on one side, as shown in Figs. 2 and 3, so that it lies over the flange of rail B, this flange of rail B being cut away angularly on the edge to properly meet the line of the web *b″* of the rail B.

I connect the point-rails B B′ together by rivets C, which, while they secure these rails together, also secure pieces of angle-iron D to said point-rails, the angle-iron making the separating medium between the point-rails B B′ and wing-rails A A′, and giving a means for attaching said wing-rails.

With angle-iron I use a bottom plate, F, as shown in Figs. 1 and 2, which has turned edges or ends *f*, and when slid on and driven into place endwise on the frog is secured by rivets G.

In some cases I extend the angle-irons beyond the point X′, so as to make ears H, which I join by a bolt or rivet, I, which serves to materially strengthen the point.

I claim—

A frog composed substantially of the two center rails, B B′, joined to form the V-shaped point, united to outside diverging or wing rails by means of angle-irons D D and bottom plate, F, the vertical sides of the angle-irons being shaped to the abutting V-formed rails, combined to form the point of the frog, and riveted or bolted thereto, the edges or horizontal parts of the angle-irons abutting against the webs of the wing or diverging rails, respectively, and being secured by bolts or rivets passing through the horizontal part of the angle-iron and the bottom supporting-plate, substantially as set forth.

In testimony of which invention I herewith set my hand.

FREDERIC C. WEIR.

Witnesses:

JOHN B. CONNELLY,
GEO. COOK.